US012596060B2

(12) United States Patent
Hokkinen et al.

(10) Patent No.: US 12,596,060 B2
(45) Date of Patent: Apr. 7, 2026

(54) METHOD FOR SAMPLING A SOLID OBJECT, AND A SYSTEM CONFIGURED TO SAMPLE A SOLID OBJECT

(71) Applicant: Teknologian tutkimuskeskus VTT Oy, Espoo (FI)

(72) Inventors: Jouni Hokkinen, Espoo (FI); Teemu Kärkelä, Espoo (FI); Anumaija Leskinen, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 0 days.

(21) Appl. No.: 18/574,341

(22) PCT Filed: Jun. 28, 2022

(86) PCT No.: PCT/FI2022/050478
§ 371 (c)(1),
(2) Date: Dec. 27, 2023

(87) PCT Pub. No.: WO2023/275443
PCT Pub. Date: Jan. 5, 2023

(65) Prior Publication Data
US 2024/0288344 A1      Aug. 29, 2024

(30) Foreign Application Priority Data

Jun. 28, 2021      (FI) ...................................... 20215767

(51) Int. Cl.
*G01N 1/28*          (2006.01)
*G01N 1/10*          (2006.01)
(Continued)

(52) U.S. Cl.
CPC ............... *G01N 1/286* (2013.01); *G01N 1/10* (2013.01); *G01N 1/2211* (2013.01); *G01N 1/405* (2013.01);
(Continued)

(58) Field of Classification Search
CPC ........... G01N 1/286; G01N 1/08; G01N 1/10; G01N 1/2211; G01N 1/405; G01N 1/4077;
(Continued)

(56) References Cited

U.S. PATENT DOCUMENTS 5,541,968 A       7/1996   Brassel
6,966,236 B2 *   11/2005   Charters .................. G01N 1/08
73/866

(Continued)

FOREIGN PATENT DOCUMENTS

CN          108214219 A       6/2018
EP          1085313 A1       3/2001
(Continued)

*Primary Examiner* — Michael Mccullough
*Assistant Examiner* — Jessica L Burkman
(74) *Attorney, Agent, or Firm* — Laine IP Oy

(57) ABSTRACT

According to an example aspect of the present invention, there is provided a method for sampling a solid object, the method comprising: providing a solid object; treating the solid object mechanically to remove material, such as pulverized material, from the solid object; and aspirating the removed material through a solids separation system, thereby separating one or more solid fractions from said material.

23 Claims, 2 Drawing Sheets

(51) Int. Cl.
  G01N 1/22 (2006.01)
  G01N 1/40 (2006.01)
  G21F 9/30 (2006.01)
(52) U.S. Cl.
  CPC ... G01N 1/4077 (2013.01); *G01N 2001/1018*
    (2013.01); *G01N 2001/2866* (2013.01); *G21F*
    *9/30* (2013.01)
(58) Field of Classification Search
  CPC .... G01N 2001/1018; G01N 2001/2866; G21F
    9/30
  USPC ........................................................ 209/133
  See application file for complete search history.

(56) References Cited

U.S. PATENT DOCUMENTS

| | | | |
|---|---|---|---|
| 10,190,413 B2 * | 1/2019 | Smith ....................... | G01N 3/12 |
| 2003/0213315 A1 | 11/2003 | Charters et al. | |
| 2015/0034531 A1 | 2/2015 | Starke | |

FOREIGN PATENT DOCUMENTS

| | | | |
|---|---|---|---|
| GB | 1151392 | A | 8/1979 |
| JP | 2002357662 | A | 12/2002 |
| JP | 2006308389 | A | 11/2006 |
| KR | 100460179 | B1 | 12/2004 |
| RU | 2668182 | C1 | 9/2018 |

* cited by examiner

METHOD FOR SAMPLING A SOLID OBJECT, AND A SYSTEM CONFIGURED TO SAMPLE A SOLID OBJECT

FIELD

The present invention relates to methods for mechanically sampling solid objects, and more particularly to methods for sampling solid objects comprising harmful substances.

BACKGROUND

Reliability of difficult to measure (DTM) radionuclide analysis in solid decommissioning waste is effected by volatility of the radionuclide, sampling technique and radiochemical analysis method. Volatile DTMs, such as $^3H$, $^{14}C$, $^{36}Cl$ and $^{125}I$, may be at least partly lost due to thermal decomposition when heat is involved in the sampling process. Thermal decomposition is chemical decomposition caused by heat, which is required to break chemical bonds. Phase transformations from solid to liquid (melting) or from solid to gas (sublimation) may be possible. Some heat is involved in majority of sampling and decommissioning processes, such as sawing, coring and drilling, and depending on the speciation, unknown amounts of the volatile DTM may be released. Materials contaminated with tritiated water (HTO) are especially problematic due to evaporation of HTO even at room temperature. Additionally, release of DTMs may occur also during sampling as pores with DTM trapped in them become exposed or upon increase of the surface area of the material enabling higher number of interactions with the surroundings causing negative bias in the radiochemically analysed activity concentration results.

One of the major factors in the reliability of the experiment results (both radiochemical and gamma spectrometric) is the representativeness of the sample. Heterogeneity of the material needs to be considered and if possible, homogenisation should be carried out. However, sometimes homogenisation is not possible or feasible for example in cases where large volumes of inhomogeneous legacy waste is to be characterised. In these cases, statistical tools may be used in development of a sampling plan.

Similar problems are encountered also when sampling solid objects or materials comprising other, non-radioactive hazardous substances. Volatile harmful substances may become vaporized and released during sampling, and the detached solid sample may in itself pose a health risk or an environmental hazard.

Depending on the sampling technique and the sample matrix, also further treatment of the sample may be needed in order to obtain a suitably fine powder. It is known to obtain a sample from a large solid object by utilizing a chisel or by sawing or coring. The detached sample is then typically transported to a laboratory for further processing. The grain size or particle size of the sample may be reduced for example by means of a hammer or by grinding with a mortar and pestle or in a sample mill. Particularly for low-solubility materials it is expedient to prepare a sample with a small particle size. Fine powder is especially beneficial for low solubility matrices such as concrete and graphite.

Additionally, every additional step in sample preparation is not only a potential source of cross contamination but also involves more work, thus lengthening the analytical procedure.

Radiochemical analysis methods require destructive techniques, such as acid digestion, combustion or fusion, in order to extract the radionuclide of interest from the solid matrix. In some cases, the solubility of the solid material to be sampled does not pose any problems. For example, complete destruction of steel may be carried out by using different mixtures of acids and by heating. On the other hand, complete destruction of concrete (especially heavy concrete) and graphite is more difficult to achieve. The silicates and oxides in the heavy concrete require alkali fusion to completely break. Even though fusion can break even the most strongly bound bonds, the heat applied in the process may volatilise radionuclides.

The present invention is intended to overcome at least part of the disadvantages in the known methods.

SUMMARY OF THE INVENTION

The invention is defined by the features of the independent claims. Some specific embodiments are defined in the dependent claims.

According to a first aspect of the present invention, there is provided a method for sampling a solid object, the method comprising: providing a solid object; treating the solid object mechanically to remove material, such as pulverized material, from the solid object; and aspirating the removed material through a solids separation system, thereby separating one or more solid fractions from said removed material.

Various embodiments of the first aspect may comprise at least one feature from the following bulleted list:

- The method comprises: treating the solid object mechanically to remove a mixture of pulverized material and gaseous substances from the solid object; aspirating the removed mixture through said solids separation system, thereby separating one or more solid fractions from said mixture; after said solids separation, aspirating the rest of the mixture through a gas separation system, thereby separating one or more gaseous fractions from the mixture.
- The method is for obtaining a solid sample from the solid object, wherein said pulverized material or one or more fractions thereof constitutes said solid sample and preferably has such average particle size that makes the sample directly suitable for analysis by a chemical, biochemical or radiochemical analysis method.
- The gaseous substances comprise one or more of the following: gaseous substances released from inside the solid object during said mechanical treatment, gaseous substances formed by chemical reactions and released during said mechanical treatment, and gaseous substances formed as a result of vaporization or sublimation of a substance during said mechanical treatment.
- The mechanical treatment comprises drilling, crushing, grinding, sawing or coring, preferably drilling.
- The solid object is encased in a chamber, typically a vacuum chamber, during said mechanical treatment.
- Said chamber is configured to prevent spreading of the removed material to the surroundings of the chamber.
- The mechanical treatment is carried out in sub-atmospheric pressure, such as in a pressure smaller than 100 Pa, preferably smaller than 10 Pa.
- Said sub-atmospheric pressure in the chamber and said aspirating is effected by a vacuum pump, and wherein an aspirated air flow in the range 0.5 to 30 L/min is generated by the vacuum pump.
- Said mechanical treatment is executed during said aspirating, to collect the removed material or mixture and to feed it to the solids separation system immediately after the removal from the solid object.

The method comprises keeping the solid object at a temperature lower than 100° C. during said mechanical treatment.

Said treating comprises drilling the solid object by a hollow drilling bore bit.

Said aspirating comprises aspirating the removed material or mixture from inside the chamber through said hollow bore bit and further to the solids separation system.

The solids separation system comprises one or more of the following group: a gravitational settling chamber, a cyclone, a multi-cyclone, an impactor, a cascade impactor, and a filter.

At least 95 wt-%, preferably substantially all of the solid matter in the removed and aspirated mixture is separated from the mixture before directing the rest of the mixture to the gas separation system.

The pulverized material collected by the solids separation system or by one or more parts of the solids separation system has an average particle size smaller than 0.1 mm, preferably smaller than 0.05 mm, more preferably smaller than 1 μm.

Said gas separation system comprises a material or composition that adsorbs or absorbs gaseous substances from said mixture.

Said gas separation system is configured to adsorb or absorb one or more isotopologues of water and/or carbon dioxide from said mixture.

The gas separation system comprises at least one absorption solution through which the mixture is passed.

Said absorption solution extracts gaseous substances from said mixture.

The gas separation system comprises a plurality of absorption solutions arranged serially, typically in gas connection with each other, through which solutions the mixture is passed consecutively.

Said absorption solutions comprise one or more first absorption solutions comprising an acidic water solution.

Said absorption solutions comprise one or more second absorption solutions comprising an alkaline water solution.

Said extracted gaseous substances comprise radioactive gaseous compounds, such as $^{14}CO_2$ and/or tritiated water.

The solid object comprises one or more materials selected from the following group: concrete, graphite, metal oxides, stone, rock.

The solid object comprises compounds or substances harmful to a human or to the environment.

The solid object originates from or comprises solid decommissioning waste.

One or more of the separated solid and/or gaseous fractions are directly suitable for analysis by a radiochemical analysis method.

The method further comprises a radiochemical analysis of at least one of the separated solid and/or gaseous fractions.

Said at least one of the separated solid and/or gaseous fractions is used, preferably without further mechanical treatment, as a sample in said radiochemical analysis.

According to a second aspect of the present invention, there is provided a system configured to sample a solid object, the system comprising: a sampling chamber, typically a vacuum chamber, configured to encase a solid object, a device configured to mechanically treat said solid object inside the chamber, to remove material, such as pulverized material, from the solid object, a solids separation system connected to an outlet of the sampling chamber, wherein said solids separation system is configured to separate one or more solid fractions from said removed material, and means for aspirating the removed material from the sampling chamber through the solids separation system.

Various embodiments of the second aspect may comprise at least one feature from the following bulleted list:

Said means for aspirating comprises a source of vacuum connected to said system and configured to generate a sub-atmospheric pressure in the sampling chamber and to aspirate the removed material from the sampling chamber into and through the solids separation system.

Said device is configured to mechanically treat said solid object thereof inside the chamber, to remove a mixture of pulverized material and gaseous substances from the solid object of parts thereof.

The system further comprises a gas separation system connected to an outlet of the solids separation system.

Said gas separation system is configured to separate one or more gaseous fractions from the mixture.

Said device comprises a drill.

The solids separation system comprises one or more of the following group: a gravitational settling chamber, a cyclone, a multi-cyclone, an impactor, a cascade impactor, and a filter.

The gas separation system comprises an absorption solution or a plurality of absorption solutions arranged serially and in gas connection with each other, through which solution or solutions the mixture is configured to be passed, wherein said absorption solution or solutions are capable of absorbing gaseous substances.

The solids separation system comprises a separation device that applies vortex separation to separate solid material from a solid/gas mixture.

The chamber is closable or gas-tight in the sense that in its closed configuration the chamber can be brought to a reduced pressure, such as sub-atmospheric pressure, by a source of vacuum connected to the chamber.

The sampling chamber is a vacuum chamber.

According to a third aspect of the present invention, there is provided use of the method according to the first aspect or the system according to the second aspect for sampling of a solid object comprising compounds or substances harmful to a human or to the environment, such as a solid object comprising toxic substances or a solid object comprising radioactive substances, such as radioactive compounds comprising one or more of the radionuclides $^{3}H$, $^{14}C$, $^{36}Cl$, or $^{125}I$, or for sampling of a solid object susceptible of releasing or generating such harmful compounds or substances during a mechanical treatment of the solid object.

According to a fourth aspect of the present invention, there is provided use of the method according to the first aspect or the system according to the second aspect in sampling of a solid material comprising volatile radionuclides, for example $^{3}H$, $^{14}C$, $^{36}Cl$, or $^{125}I$.

Advantages of the Invention

An advantage of the present invention is that sampling of harmful solid objects, such as radioactive or chemically toxic solid objects is facilitated and becomes safer.

By means of the present method, obtaining a representative sample may be facilitated.

An advantage of the present invention is that spreading of contaminants, such as radioactive or chemically toxic contaminants, to the surroundings during sampling is reduced.

An advantage of the present invention is that solid or pulverized fractions directly suitable for further analysis may be generated and sample pre-treatment steps may be avoided.

The present invention may be particularly advantageous for the purpose of obtaining samples for such analysis methods in which the sample needs to be in a liquid or dissolved form since the fractionated sample may facilitate dissolution of the sample, in particular for sparingly soluble materials and substances.

The risk of sample contamination or decomposition may be reduced as the sample may be directly advanced to an analysis step.

An advantage of the present invention is that the sampled material may be quickly separated to solid and gaseous fractions, which may be analysed separately.

An advantage of the present invention is that transport and storage of the potentially harmful sampled material may be reduced.

The present invention may be utilized for collecting a sample of any desired size to a container.

A further advantage is that the sample may be collected on-site.

EMBODIMENTS

Definitions

Figure 1:
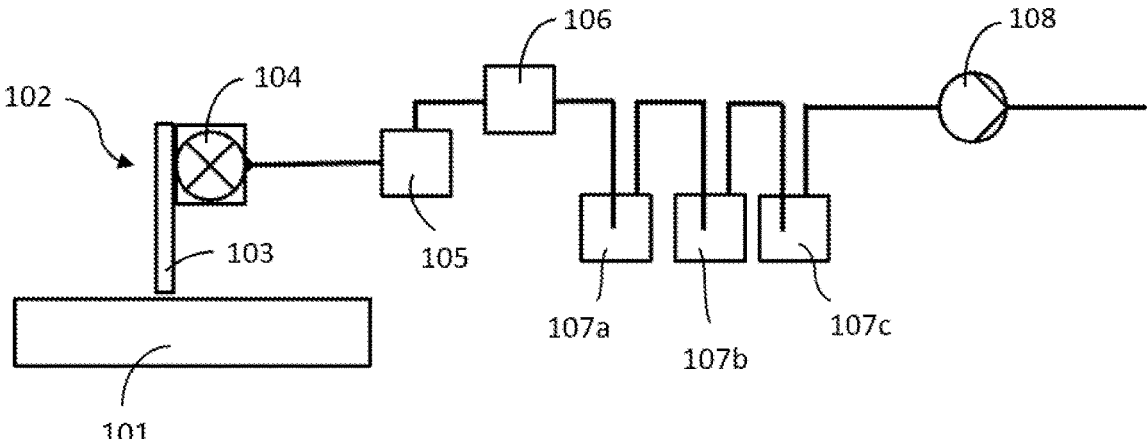
FIGS. 1 to 4 illustrate exemplary set-ups in accordance with at least some embodiments of the present invention.

Unless otherwise stated herein or clear from the context, any percentages referred to herein are expressed as percent by weight based on a total weight of the respective composition.

As used herein, the term "average particle size" refers to the number average particle size based on a largest linear dimension of the particles (also referred to as "diameter") as determined using a technique known to those skilled in the art.

In the present context, the expression "compound that is harmful or hazardous to a human or the environment" typically refers to such a compound that is radioactive or toxic or carcinogenic or causes irritation or causes aspiration hazard or is hazardous to the environment.

In the present context, the term 'sampling' refers to a process of removing an amount of material from an object being sampled.

In the present context, the term 'vacuum chamber' refers to a rigid enclosure from which air and other gases can be removed by a vacuum pump, to result in a low-pressure environment within the chamber.

In the present context, the expression "speciation of a radionuclide" refers broadly to the physico-chemical form of a radionuclide, including isotopic composition, physical form (such as a solution, a solid, a gas) and molecular composition.

The present invention provides a new method that facilitates mechanical sampling or other mechanical treatments of a solid object, such as a solid object comprising volatile radionuclides. In the present method, the sampling typically generates a mixture of pulverized material and gaseous substances, which are collected and separated, for example to obtain a pulverized sample and a gaseous sample.

By 'solid object' it is referred to an object which comprises at least one solid piece and wherein each solid piece has structural rigidity. The object is mainly composed of solid materials but it may contain minor amounts of entrapped gases or liquids within the solid material.

In some embodiments, the present invention provides a method comprising providing a solid object; treating the solid object mechanically to remove pulverized material from the solid object; and aspirating the removed pulverized material through a solids separation system, thereby separating one or more solid fractions from said pulverized material.

In typical embodiments, the method comprises treating the solid object mechanically to remove a mixture of pulverized material and gaseous substances from the solid object; aspirating the removed mixture through said solids separation system, thereby separating one or more solid fractions from said mixture; and after said solids separation, aspirating the rest of the mixture through a gas separation system, thereby separating one or more gaseous fractions from the mixture.

Preferably, the mechanical treatment comprises drilling, crushing, grinding, sawing or coring, preferably drilling.

The solid object to be treated mechanically may be formed by a single solid piece or it may be comprised of a plurality of solid pieces, such as rock fragments, or a crush with a relatively large grain size, for example at least 5 mm. Such solid pieces or fragments may contain minor amounts of entrapped gaseous substances.

In fact the solid object may comprise any object or a plurality of objects that has structural rigidity and is suitable for being treated mechanically by a pulverizing method, such as drilling, crushing, grinding, sawing or coring. Typically said pulverizing method generates solid pulverized material that has a smaller average particle or grain size than the solid object to be treated.

In one embodiment, the mechanical treatment comprises crushing or grinding or breaking to smaller pieces.

In addition to actual or primary sampling of a macroscopic solid object, the present method may be utilized in connection with mechanical treatments of already-obtained solid samples. For example, the present method may be used for secondary sampling of solid fragments, such as a coarse crush, detached from a solid object by other sampling methods.

Typically, the solid object is encased in a chamber, such as a safety crate, during said mechanical treatment to prevent spreading of the removed material to the surroundings of the chamber.

The chamber is preferably closable or gas-tight in the sense that in the closed configuration the chamber can be brought to a reduced, such as sub-atmospheric pressure and most preferably function as a vacuum chamber. The chamber is typically connectable to at least one source of vacuum.

In a preferred embodiment, the solid object is encased in a vacuum chamber.

The chamber may reduce spreading of contaminants, such as radioactive or chemically toxic contaminants, to the surroundings during sampling.

The chamber may enable recovering also the fractions evaporating from the solid object during mechanical treatment since those are also aspirated into and through the solids separation system. The gaseous matter can be optionally fractionated after the solids separation system.

Thus, the present method and the system may enable efficient mechanical sampling of a solid object into one or more solid and/or gaseous fractions directly suitable for further analysis, typically combined with a reduced spreading of contaminants during sampling or transport or storage.

In the present context, the expression "the fraction is directly suitable for an analysis" typically means that the fraction can be used as a sample in an analysis either as such or after dissolution to a solvent, preferably without any further mechanical treatment such as grinding.

In one embodiment, the mechanical treatment comprises grinding the solid object in a ball mill or sample mill or other grinding or crushing device. The ball mill or other grinding device may be configured to encase the solid object during the grinding. As a result of the grinding, pulverized material is removed from the solid object. A solids separation system is connected to the grinding device, and the removed material is aspirated through the solids separation system by means of suction generated by a vacuum source. Preferably said aspiration is carried out continuously during the grinding and pulverization of the solid object.

In some embodiments, the solid object to be sampled is made of a hard material, for example concrete or similar. The harder the material to be sampled is, the more the temperature tends to rise during mechanical sampling. It is advantageous to avoid temperature increase for the purpose of preventing volatilization of sample constituents.

In one embodiment, the temperature of the solid object is kept below 100° C., such as below 50° C. during the mechanical treatment, such as sampling. In a particularly preferred embodiment, the temperature of the solid object is between 15 and 30° C. during the sampling. An advantage of keeping the temperature of the solid object as low as possible is to reduce vaporization of harmful substances, such as radionuclides during the sampling. For example, $^3$H may be released in the form of HTO, which will vaporize and be lost very easily if the temperature increases.

Other examples of harmful, gaseous substances include methane and gaseous substances comprising iodine and/or chlorine.

In one embodiment, the solid object is cooled or allowed to cool during the sampling, for example to a temperature lower than room temperature.

In one embodiment, the mechanical treatment is periodically paused in order to let the sampled object or the sampling device, for example a drilling bore bit, cool.

In a preferred embodiment, the entire mechanical treatment is carried out in sub-atmospheric pressure. The pressure may be less than 15 Pa, for example in the range 1 to 10 Pa.

Preferably, the sub-atmospheric pressure in the chamber and said aspirating is effected by a vacuum pump. The vacuum pump generates an aspirated air flow carrying the removed material out of the chamber and through a solids separation system, and optionally even further through a gas separation system.

Preferably the gas separation system is positioned downstream from the solids separation system.

In some embodiments the solids separation system and the gas separation system may be a combined system for separation of solids and gases simultaneously, for example into one or more absorption solutions.

In some embodiments, the chamber is connected to an additional source of vacuum in addition to the vacuum pump that is responsible for generating an aspirated air flow carrying the removed material or at least a substantial part of it out of the chamber. An advantage of the additional source of vacuum is that a very low pressure, such as less than 10 Pa, may be generated in the chamber, for example for the purpose of more effectively preventing spreading of pulverized, particulate matter into the surroundings.

The aspirated air flow is preferably at least 0.5 L/min, for example in the range 0.5 to 10 L/min, more preferably in the range 1 to 5 L/min.

It is advantageous to execute the entire mechanical treatment while continuously aspirating, to collect the removed or sampled material or mixture and to feed it to the solids separation system immediately after its removal from the solid object.

It is advantageous to collect the pulverized material and the released and/or generated gases in the immediate vicinity of the point to which said mechanical treatment is directed or imposed on, such as in the immediate vicinity of the drilling point on a surface of the object.

In some embodiments, drilling is used as the sampling method. The method may comprise drilling the solid object by a hollow drilling bore bit. An advantage of using a hollow drilling bore bit is that aspirating may be carried out through the bore bit, to effectively collect the pulverized and vaporized materials.

The pulverized material may be collected and thereafter separated by a multi-stage solids separation system. For example, several solids fractions may be separated from the removed pulverized material.

In one embodiment, the solids separation system comprises one or more of the following devices: a gravitational settling chamber, a cyclone, a multi-cyclone, an impactor, an cascade impactor, and a filter.

In one embodiment, the solids separation system comprises a separation device that is configured to separate solid material from a solid/gas mixture on the basis of gravity. An example is a gravity settling chamber which utilizes the principle of gravity to settle particulate matter in a gas stream passing through the chamber. Typically, the gas velocity in the chamber is adapted to be sufficiently low so that the particulate matter is allowed to settle out of the moving gas stream under the action of gravity. The settled particulate matter becomes collected at the bottom of the chamber.

In one embodiment, the solids separation system comprises a separation device that applies vortex separation to separate solid material from a solid/gas mixture. An example is a cyclone, in which rotational effects and gravity are used for achieving separation. Another example is a multi-cyclone, which comprises several cyclones in series, the cyclones having decreasing cut-off diameters, which allows separation and classification of particles by their size or diameter.

In one embodiment, the solids separation system comprises an impactor or a cascade impactor comprising several impactors in series with decreasing cut-off diameters. A cascade impactor is a device that classifies particles present in a gas stream into known size ranges. The gas stream is drawn through a cascade of progressively finer nozzles. The gas jets from these nozzles impact on plane sampling surfaces and each stage collects finer particles than its predecessor.

In one embodiment, the solids separation system comprises at least one filter. The filter may have a pore size in the range 0.1 to 1 μm.

The solids separation system may be embodied in various ways by arranging one or more suitable solids separation devices in series and/or in parallel, preferably in series.

In one example, the solids separation system comprises or consists of a filter.

In one example, the solids separation system comprises or consists of a gravitational settling chamber and a filter downstream thereof.

In one example, the solids separation system comprises or consists of a cyclone or a multi-cyclone, and a filter downstream thereof.

In one example, the solids separation system comprises or consists of an impactor or a cascade impactor, and a filter downstream thereof.

In one example, the solids separation system comprises or consists of a gravitational settling chamber, a cyclone or a multi-cyclone downstream thereof, and a filter further downstream thereof.

In one example, the solids separation system comprises or consists of a gravitational settling chamber, an impactor or a cascade impactor downstream thereof, and a filter further downstream thereof.

In one example, the solids separation system comprises or consists of a cyclone or a multi-cyclone, an impactor or a cascade impactor downstream thereof, and a filter further downstream thereof.

In one example, the solids separation system comprises or consists of a gravitational settling chamber, a cyclone or a multi-cyclone downstream thereof, an impactor or a cascade impactor further downstream thereof, and a filter still further downstream thereof.

The mechanical treatment typically detaches solid material, such as pulverized material, and simultaneously releases and/or generates gaseous substances from the solid object. The gaseous substances may be gases entrapped in pores or internal pockets of the solid object. The gaseous substances or compounds may be formed by vaporization of constituents of the solid object. Advantageously, the released gaseous substances, which may comprise volatile radionuclides, are also collected to prevent their spreading to the surroundings and to enable a more quantitative assessment of the composition of the sampled object.

Various means may be used for trapping or extracting said gaseous substances. In one example, trapping is carried out by using a material that adsorbs or absorbs gaseous substances or compounds from said mixture.

In preferred embodiments, the gas trapping system comprises at least one absorption solution or a solvent or a mixture of solvents through which the mixture output from the solids separation system is passed. Said absorption solution extracts or traps at least a part of the gaseous substances in said mixture.

The gas trapping system may comprise a solid or liquid matrix capable of absorbing or adsorbing gaseous compounds of interest.

The gas trapping system may comprise a cryogenic trap.

The gas trapping system may comprise an ion exchange resin.

In one embodiment, a plurality of absorption solutions are arranged serially, and the mixture is passed or flown through the solutions consecutively. The absorption solutions may have different compositions with regard to each other. The absorption solutions may be configured to trap different gaseous compounds.

For example, said absorption solutions may comprise one or more first absorption solutions comprising an acidic water solution and one or more second absorption solutions comprising an alkaline water solution. The solutions may be in any suitable order depending on the volatile compounds to be collected.

An advantage of arranging multiple similar absorption solutions in series is that it can be better ensured that all of the gaseous compound of interest becomes collected. The total absorption capacity is increased. Further, if the first absorption solution is not capable of absorbing all of the compound of interest, the subsequent solution(s) will absorb the rest, preferably until all of the gaseous compound of interest has been absorbed. Inadequate capacity of the first absorption solution will be revealed by presence of the compound of interest in the subsequent absorption solutions.

In one embodiment, the absorption solutions are selected from the following solutions or solvents: an aqueous $HNO_3$ solution, an aqueous NaOH solution, water.

Also other methods suitable for trapping gaseous substances may be used.

Volatile radionuclides that may be vaporized from the solid object may include one or more of the following radionuclides: $^3H$, $^{14}C$, $^{36}Cl$ and $^{125}I$.

The present invention may also be used for sampling and collecting non-radioactive materials, particularly such non-radioactive materials that tend to vaporize in the mechanical sampling conditions and temperatures used.

The present invention may be used for sampling of harmful solid objects and materials from mining industry, or any industries generating solid harmful wastes.

In one embodiment, the method is used for assessing the presence of microbial activity in a solid object, such as solid waste. In this case, the pores of the solid waste material may comprise entrapped methane gas due to microbial activity, which methane may become released upon mechanical treatment and may be collected for analysis.

It is possible that $^3H$ is released during sampling in the form of HTO. $^{14}C$ may be released in the form of carbon dioxide.

In one embodiment, said extracted or trapped gaseous substances comprise radioactive gaseous substances, such as $^{14}CO_2$ and/or tritiated water.

The present method may be applied for obtaining samples from any solid object that can be subjected to such a mechanical treatment that detaches solid, such as pulverized material from the object.

For example, the solid object may comprise or consist of one or more materials selected from the following group: concrete, graphite, metal oxides, stone, rock.

The sampled material or a part of it may be analysed to determine its radioactivity, its chemical or biochemical composition and/or its isotopic composition.

The present invention may be particularly advantageous for the purpose of obtaining samples for such analysis methods in which the sample needs to be in a liquid or dissolved form. As the present method may directly produce pulverized, fine-grained and suitably fractioned sample material with a high surface area, the dissolution of the sample is facilitated, particularly for sparingly soluble materials and substances.

In one embodiment, the speciation of radionuclides in the sampled material or a part of it may be carried out for example by thermoanalytical methods.

After being collected, the pulverized material may be decomposed by pyrolysis and the obtained pyrolysis products collected and subsequently analysed for example by liquid scintillation counting.

In some embodiments, the solid object comprises radioactive material, such as radioactive waste material.

In some embodiments, the solid object originates from or comprises solid decommissioning waste.

In some embodiments, the solid object comprises chemically, physically, microbiologically and/or environmentally hazardous substances.

In some embodiments, the solid object comprises toxic substances.

In some embodiments, the solid object comprises environmentally hazardous substances.

FIGS. 1 to 4 illustrate exemplary set-ups in accordance with at least some embodiments of the present invention.

The set-ups are suitable for any drillable and pulverizable material in order to collect samples that comprise powdery or particulate material and/or gaseous substances. The collected samples may be analysed with any desired analysis method afterwards.

FIG. 1 describes a sampling and collection set-up according to an embodiment. The set-up comprises a safety crate/enclosure 101 comprising the solid object to be sampled, a drill 102 comprising a hollow bore bit 103, a gravitational settling chamber 104, a cyclone 105, a filter 106, a set of three absorption solution bottles (bubbling bottles) 107$a$, 107$b$, 107$c$ and a vacuum pump 108.

The set-up is used to generate and extract powdery and gaseous samples from solid harmful objects by a pulverizing method.

The solid harmful object is placed in the safety crate 101. The crate reduces the risk of spreading of contamination from the harmful object to the surrounding area. A hole is drilled into the object with the drill 102, preferably a hollow twist drill, and the generated and released powdery particles and gaseous substances are sucked through the bore bit 103 by the suction generated by the vacuum pump 108. The suction keeps the pressure inside the safety crate lower than the ambient pressure, which prevents leakage of contaminants to the outside of the crate, thus increasing the safety of this method.

The particle size generated during drilling may depend on the qualities of the solid object to be drilled. It may also depend on the drill rotation speed and the suction flow rate. A particle size analysis may be carried out for the generated powder. It is also possible to incorporate online aerosol measurement devices to the set-up, for example before the cyclone or before the filter, to analyse particle properties online during drilling.

The system applies three methods to collect powdery samples: the gravitational settling chamber 104, the cyclone 105 and the filter 106. A back-up filter collects all the finest particles that the first two methods could not collect. All the particles collected in the gravitational settling chamber and in the cyclone can be very easily emptied into a container, and thereafter drilling can be continued.

The aerosol particle cut-off diameters of the settling chamber and the cyclone can be determined experimentally or approximated by calculation.

The absorption solution bottles (bubbling bottles) 107$a$, 107$b$, 107$c$ are used to trap gaseous substances released and vaporized from the solid object during the drilling. The composition of the absorption solutions may be adjusted to enable collection of gaseous substances and compounds of interest.

The air flowing through the bubbling bottles is in a pressure that is lower than the ambient pressure.

The air flow rate through the drill dictates where the particles are mostly collected. The bubbling bottles are the most efficient in trapping gaseous substances when the order of magnitude of the flow rate is approximately one litre per minute, such as 0.5 to 2 L/min. At such low flow rates, most of the particles are collected in the gravitational settling chamber. If higher flow rates, such as at least 2 L/min, are used, the settling chamber may become inefficient and only the coarsest particles will stay in it, but the collection efficiency of the cyclone improves with the increasing flow rate. The flow rate generated by the suction can be controlled by the adjusting valve located upstream of the vacuum pump.

The set-up was found suitable for taking controlled samples from concrete structures of a research reactor to monitor the content of radionuclides as part of decommissioning work, as described in Example below. The most interesting gaseous components in this case were tritium (3H) in the water vapour and $^{14}C$ in the carbon dioxide compound.

Figure 2:
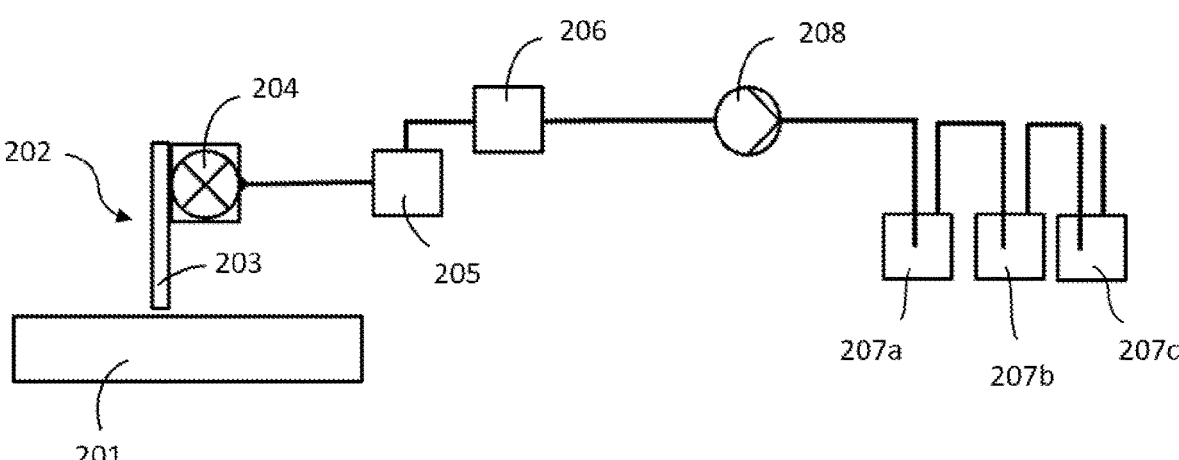

In an alternative set-up, illustrated in FIG. 2, the bubbling bottles 207$a$, 207$b$, 207$c$ have been connected to the outlet of the vacuum pump 208. In this arrangement, the bottles are in ambient pressure plus the hydrostatic pressure caused by the bubbling bottles themselves.

Figure 3:
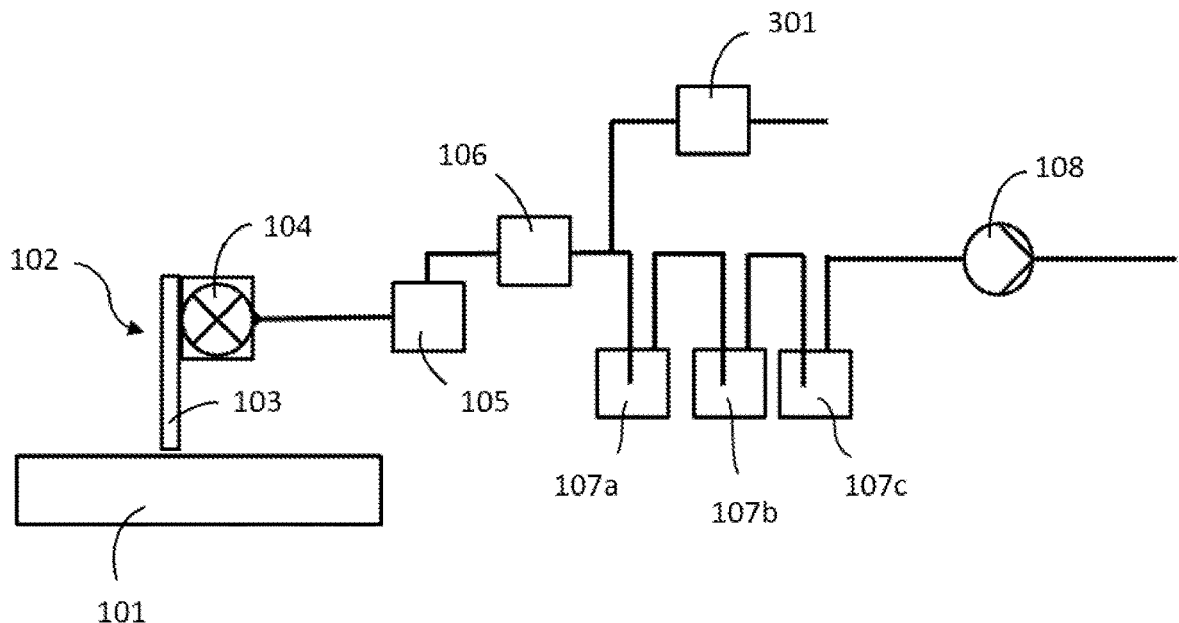

FIG. 3 shows the system of FIG. 1 but further including a gas analyser 301, arranged in parallel with the gas separation system consisting of the three absorption solution bottles. The gas analyser is connected to an inlet of a second vacuum source.

The gas analyser 301, such as a Fourier-transform infrared spectrometer (FTIR), may be used for monitoring the composition of the gas mixture online.

Figure 4:
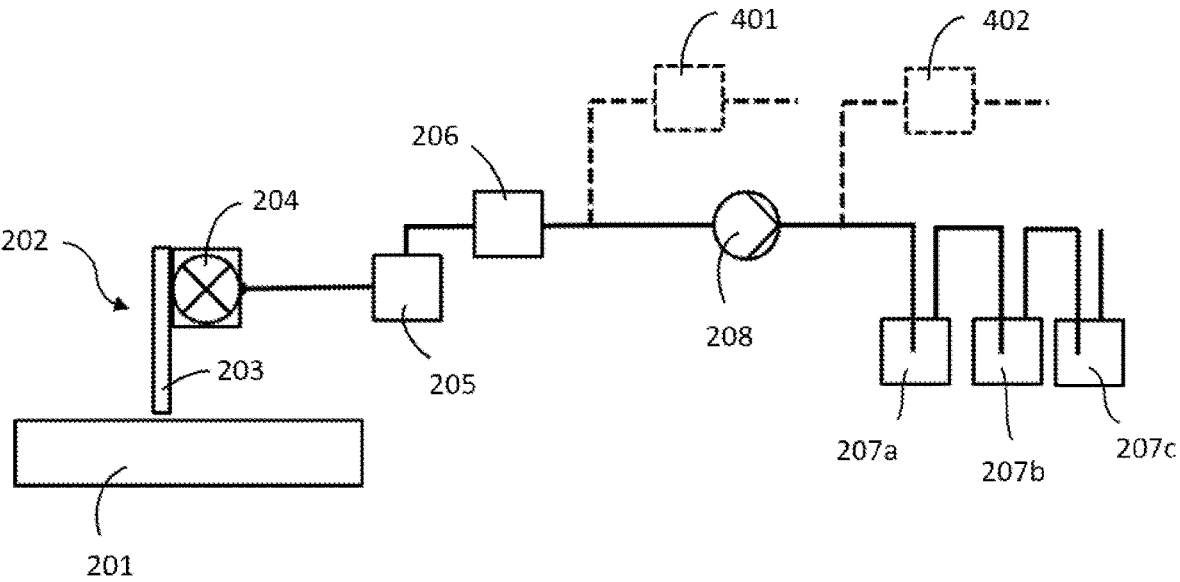

FIG. 4 shows the system of FIG. 2 but further showing two optional gas analysers 401, 402 of which one, both or none may be used.

Example

Solid Material to be Sampled

In the following experiments, sampling of biological shield concrete in a FiR1 research reactor was carried out. FiR1 is a TRIGA Mark II type research reactor under decommissioning in Finland.

Since the speciation of $^3H$ and consequently its volatility depend on the speciations of the activating elements, historical data on the chemical composition of the concrete FiR1 biological shield concrete was retrieved. A chemical analysis had been carried out in 2010s by drilling an inactivated FiR1 biological shield concrete core and carrying out a chemical composition analysis. The results of the analysis showed that the FiR1 biological shield concrete contained approximately 30 ppm of Li and 4300 ppm of H. Additionally, results from a thermoanalytical analysis showed that the concrete contained 0.6 to 0.8% of $CO_2$ as carbonates, 4.4 to 4.6% of $H_2O$, 1.3 to 1.7% of $Ca(OH)_2$ and 1.4 to 1.9% of $CaCO_3$. The composition data suggested that in the FiR1 concrete a part of the $^3H$ appeared to exist as strongly bound, while another part appeared to exist as loosely bound. Therefore, partial release of $^3H$ during drilling was expected.

Experimental

Reagents and Equipment 0.1 M $HNO_3$ absorption solution for $^3H$ trapping was prepared by mixing analytical grade concentrated $HNO_3$ with deionised water. 0.4 M NaOH absorption solution for $^{14}C$ trapping was prepared by mixing analytical grade NaOH pellets with deionised water.

The liquid scintillation cocktail 'HiSafe' was purchased from Perkin Elmer. Hidex 300 SL liquid scintillation counter (LSC) was used in measurements of $^3H$ and $^{14}C$. The measurement protocols used were Hidex provided, using a CoreF function to convert TDCR (triple to double count rate) results to measurement efficiencies.

Drilling and Sample Collection Set-Up

The drilling set-up is presented in FIG. 1. The concrete core was placed inside a safety crate and secured using a screw vice. The safety crate had a 2 cm diameter hole in the lid, through which a 12 mm diameter hollow bore bit (DeWalt Hollow Bit) was introduced for drilling the concrete core. The safety crate acted as a barrier that prevents spreading of contamination to the surroundings. Air was sucked by using a vacuum pump from the safety crate through the drill and further through the rest of the set-up, which comprised three separation steps for collecting pulverized material and three absorption bottles for collecting gaseous material, as described later in more detail. A small underpressure in the safety crate also functioned as a barrier preventing spreading of contamination to the surroundings.

It was observed that during drilling the temperature of the bore bit was in the range 50 to 100° C.

The pulverized sample, i.e. the powder released during drilling, was collected in three separate steps. The first separation step consisted of a gravitational settling chamber, which had been constructed in the form of a bore bit handle. The gravitational settling chamber separated the coarsest particles. Downstream from the gravitational settling chamber, a cyclone (custom-made by VTT) was arranged to function as the second separation step. As the third separation step, downstream from the cyclone, a filter (Sartofluor Midicap, 0.2 μm pore size) was arranged to collect the finest powder.

The cyclone had a 10 ml reservoir for sample collection in its bottom part, secured with a vacuum clamp. The gravitational settling chamber and the cyclone were emptied to a separate container in regular intervals. The finest particles were detached from the filter by tapping.

Downstream from the filter, three absorption solution bottles were arranged for trapping and collecting volatile $^3$H and $^{14}$C. Air was sucked through the three bottles. The flow rate was adjusted by using an adjusting valve (Swagelog Integral Bonnet needle valve). The flow rate was adjusted to be as high as possible for effective powder collection and at the same time low enough to enable sufficient contact time between air bubbles and the absorption solutions in the absorption bottles. The adjusted flow rate was 14 L/min, as measured from the vacuum pump outlet by using a rotameter (Brooks Instruments B.V.). At this flow rate, approximately one half of the particles detached upon drilling were collected by the gravitational settling chamber and the other half by the cyclone.

The three absorption solution bottles were connected in a row between the filter and the vacuum pump (FIG. 1). The first absorption solution was configured for $^3$H trapping, and the second and the third absorption solutions were configured for $^{14}$C trapping. The detection limits for $^3$H and $^{14}$C depended on the amount of absorption solution in the bottles and the effectiveness of the solutions to absorb the analytes of interest. Bigger bottles with larger absorption solution volumes lower the detection limit. In these experiments, the first absorption solution bottle contained 400 ml of 0.1 M HNO$_3$, and the second and the third absorption solution bottles each contained 400 ml of 0.4 M NaOH.

The initial tests showed that the set-up was suitable for collection of powdered samples without spreading powdered concrete outside of the crate.

The grain size distribution was determined by using sieves of 0.5, 0.25, 0.149, 0.074 and 0.044 mm.

Drilling of Activated FiR1 Concrete

The studied activated concrete originated from the biological shield of a FiR1 research reactor. The concrete consisted of up to 80 mm diameter stones. The core had been taken from the biological shield approximately 1.5 years earlier and the most active section of the core was sampled by the present method. Since the dose rate of the core was low (<5 μSv/hour), additional shielding was not needed. However, personal protection equipment (PPE) was used in order to minimise the risk of internal contamination. The drilling was carried out during several approximately 1-hour long sampling sessions, because wearing the PPE and due to the hardness of the concrete the drilling was physically very demanding. In total, 183 g of activated concrete was drilled during 2 working days, totaling 6.5 hours of drilling. A relatively large amount of concrete was pulverised in order to obtain a representative and homogeneous sample for characterisation.

Analysis of Released and Vaporised $^3$H and $^{14}$C

The released and vaporized $^3$H and $^{14}$C were collected in the three absorption solutions as described above and subsequently analysed by LSC. HiSafe liquid scintillation cocktail was used. The duration of the LSC measurements was 1800 s unless mentioned otherwise.

Due to the long-lasting luminescence in the 0.4 M NaOH solutions, all the samples were allowed to stabilise in dark at least for 24 hours. The detection limit (CLd) was calculated using Eq. 1:

$$CLd=(2.71+4.5(Nb)^{1/2})/t/\eta/m$$

Where Nb=blank counts
t=counting time (s)
η=counting efficiency
m=sample weight (g)

So called method blanks were collected by pumping air through a fresh set of absorption solutions for an equal period of time and with the same flow rate as during sample collection. The blank solutions were analysed by LSC in the same way as the sample solutions.

Results and Discussion

Grain Size Analysis

The drilled and pulverized FiR1 activated concrete was very fine grain sized. Thus, no further pre-treatment was needed before carrying out radiochemical analyses of the pulverized sample.

The grain size analysis results showed that 85 wt-% of the pulverized sample had a grain size smaller than 0.044 mm in diameter, while the rest of the sample was evenly distributed between 0.25, 0.149, 0.074, and 0.044 mm sieves, having 3-4 wt-% of the sample in each sieve. The particle size generated during drilling probably mostly depends on the composition of the object, but it may also depend on the drill rotation speed and the suction flow rate. It may be possible to connect an online aerosol measurement device into the set-up, for example before the cyclone or before the filter, to analyse the particle size of the pulverized sample in situ.

Release of Gaseous $^3$H and $^{14}$C During Drilling of FiR1 Activated Concrete The LSC results for the first absorption bottle showed that 3.3 kBq of $^3$H was released during the two days of drilling. The $^3$H LOD 1.0 mBq/g was calculated from the method blank.

The $^{14}$C LSC results showed that 200 CPM signal was measured in the second absorption bottle whereas the signal was below LOD in the third absorption bottle. A closer study of the spectrum showed that the detected counts in the second absorption bottle seemed to originate from $^3$H. In cases where $^3$H and $^{14}$C are measured separately, the measurement windows in Hidex are 5-200 and 5-600, respectively. However, when double labelled samples with $^3$H and $^{14}$C are measured simultaneously, the measurement windows are 5-200 and 201-650, respectively. Therefore, the sample from the second absorption bottle was re-measured using a narrower 201-650 window and a longer measurement time (14 400 s) in low background mode using a guard. The results showed that the signal was below LOD (limit of detection). The sample was then re-measured using the $^3$H protocol. The results showed that 1.0 kBq of $^3$H had leaked from the first absorption bottle into the second. Therefore, in total 4.4 kBq of $^3$H was released during drilling and 76% was absorbed in the first absorption bottle and 24% in the second. The calculated $^3$H release rate was therefore 24 Bq/g whereas there was no measurable amount of $^{14}$C released. The $^{14}$C LOD 0.7 mBq/g was calculated from the method blank. The efficiency of the 0.1 M HNO$_3$ absorption solution can be estimated to be good even though 24% of the released $^3$H was trapped in the second absorption bottle. This phenomenon is not too problematic since $^3$H and $^{14}$C can be measured in the same sample by using a double labelling measurement protocol of LSC.

Evaporation of the absorption solutions during the drilling were not monitored because relatively small volumes were estimated to evaporate. However, if evaporation would be a problem, cooling of the solutions, for example with ice blocks, could be easily carried out. Also, weighing the solutions in the beginning and in the end of drilling would have enabled making corrections to account for evaporation. Additionally, in the used set-up, the absorption bottles were in a pressure that was lower than ambient pressure. If the absorption bottles were placed to the outlet of the vacuum pump, the bottles would be in ambient pressure plus the hydrostatic pressure caused by the bottles themselves, which would reduce evaporation.

Analysis of $^3$H and $^{14}$C in the Drilled and Pulverized FiR1 Activated Concrete The drilled and pulverized FiR1 activated concrete sample was analysed by a method involving pyrolysis of the sample and a subsequent LSC analysis of the pyrolysed and collected fractions.

The pyrolysis results for 100 mg drilled sample showed that the pulverized activated concrete contained 43±7 Bq/g of $^3$H (not corrected with the $^3$H released in gaseous form during sampling) whereas there was no detectable amount of $^{14}$C. The results were consistent with sample amounts up to 5 g.

Therefore, the total $^3$H concentration (including all $^3$H released during sampling, either in gaseous form or in pulverized solid form) in the activated concrete was 67 Bq/g. This means that approximately 36% of the total $^3$H was released in gaseous form during sampling.

A much lower level of $^{14}$C compared to $^3$H was expected to be present in the activated concrete core according to the amount of activating elements and cross sections and this was verified by the analysis.

Conclusions

The developed sampling set-up was suitable for sampling of activated concrete in pulverized form and for collection of released, gaseous $^3$H and also possibly $^{14}$C.

Additionally, the set-up may be utilised in sampling of activated graphite and more generally any drillable, harmful solid material. In the case of graphite, the drilling is expected to be easier as the material is softer. Softness of the material to be sampled leads to a higher contamination risk, particularly when sampling is carried out by drilling. The present sampling set-up may be advantageous for sampling of such soft solid objects.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

INDUSTRIAL APPLICABILITY

The present invention is industrially applicable at least in sampling of solid objects comprising harmful or hazardous substances.

ACRONYMS LIST

DTM difficult to measure radionuclide
HTO tritiated water
LOD limit of detection

REFERENCE SIGNS LIST 101, 201 safety crate
102, 202 drill
103, 203 hollow bore bit
104, 204 gravitational settling chamber
105, 205 cyclone
106, 206 filter
107a, 107b, 107c, 207a, 2076, 207c absorption solution bottles
108, 208 vacuum pump
301, 401, 402 gas analyser

The invention claimed is:

1. A method for sampling a solid object, the method comprising:

treating the solid object mechanically in sub-atmospheric pressure to remove a mixture of pulverized material and gaseous substances from the solid object;

aspirating the removed mixture through a solids separation system, thereby separating one or more solid fractions from said removed mixture; and after said solids separation, aspirating the rest of the mixture through a gas separation system, thereby separating one or more gaseous fractions from the mixture, wherein the solids separation system comprises a separation device that applies vortex separation to separate solid material from a solid/gas mixture, and wherein said gas separation system comprises a material or composition that adsorbs or absorbs gaseous substances from said mixture.

2. The method according to claim 1, wherein a solid sample is obtained from the solid object, wherein said pulverized material or one or more fractions thereof constitutes said solid sample and has such average particle size that makes the sample directly suitable for analysis by a chemical, biochemical or radiochemical analysis method.

3. The method according to claim 1, wherein the gaseous substances comprise one or more gaseous substances selected from the group consisting of: gaseous substances released from inside the solid object during said mechanical treatment, gaseous substances formed by chemical reactions and released during said mechanical treatment, and gaseous substances formed as a result of vaporization or sublimation of a substance during said mechanical treatment.

4. The method according to claim 1, wherein the mechanical treatment comprises drilling, crushing, grinding, sawing or coring.

5. The method according to claim 1, wherein the solid object is encased in a chamber, during said mechanical treatment, and wherein said chamber is configured to prevent spreading of the removed material to the surroundings of the chamber.

6. The method according to claim 1, wherein said sub-atmospheric pressure and said aspirating is effected by a vacuum pump, and wherein an aspirated air flow in the range 0.5 to 30 L/min is generated by the vacuum pump.

7. The method according to claim 1, wherein said mechanical treatment is executed during said aspirating, to collect the removed mixture and to feed it to the solids separation system immediately after the removal from the solid object.

8. The method according to claim 1, comprising keeping the solid object at a temperature lower than 100° C. during said mechanical treatment.

9. The method according to claim 1, wherein:

said treating comprises drilling the solid object by a hollow drilling bore bit, and said aspirating comprises aspirating the mixture from inside the chamber through said hollow bore bit and further to the solids separation system.

10. The method according to claim 1, wherein the solids separation system comprises one or more selected from the group consisting of: a gravitational settling chamber, a cyclone, a multi-cyclone, an impactor, a cascade impactor, and a filter.

11. The method according to claim 1, wherein at least 95 wt-% of the solid matter in the removed and aspirated mixture is separated from the mixture before directing the rest of the mixture to the gas separation system.

12. The method according to claim 1, wherein the pulverized material collected by the solids separation system or by one or more parts of the solids separation system has an average particle size smaller than 0.1 mm.

13. The method according to claim 1, wherein said gas separation system is configured to adsorb or absorb one or more isotopologues of water and/or carbon dioxide from said mixture.

14. The method according to claim 1, wherein the gas separation system comprises at least one absorption solution through which the mixture is passed, whereby said absorption solution extracts gaseous substances from said mixture.

15. The method according to claim 14, wherein said extracted gaseous substances comprise radioactive gaseous compounds, said radioactive gaseous compounds comprising $^{14}CO_2$ and/or tritiated water.

16. The method according to claim 1, wherein the gas separation system comprises a plurality of absorption solutions arranged serially, in gas connection with each other, through which solutions the mixture is passed consecutively.

17. The method according to claim 16, wherein said absorption solutions comprise one or more first absorption solutions comprising an acidic water solution and one or more second absorption solutions comprising an alkaline water solution.

18. The method according to claim 1, wherein the solid object comprises one or more materials selected from the group consisting of: concrete, graphite, metal oxides, stone, and rock.

19. The method according to claim 1, wherein the solid object comprises compounds or substances harmful to a human or to the environment.

20. The method according to claim 1, wherein one or more of the separated solid and/or gaseous fractions are directly suitable for analysis by a radiochemical analysis method.

21. The method according to claim 1, further comprising analysing by a radiochemical analysis at least one of the separated solid and/or gaseous fractions, wherein said at least one of the separated solid and/or gaseous fractions is used without further mechanical treatment, as a sample in said radiochemical analysis.

22. A system configured to sample a solid object, the system comprising:

a sampling chamber configured to encase a solid object, a device configured to mechanically treat said solid object inside the sampling chamber in sub-atmospheric pressure, to remove a mixture of pulverized material and gaseous substances from the solid object, a solids separation system connected to an outlet of the sampling chamber, wherein said solids separation system is configured to separate one or more solid fractions from said removed material, and means for aspirating the removed material from the sampling chamber through the solids separation system, wherein:

the system further comprises a gas separation system connected to an outlet of the solids separation system, wherein said gas separation system is configured to separate one or more gaseous fractions from the mixture, and wherein the solids separation system comprises a separation device that is configured to apply vortex separation to separate solid material from a solid/gas mixture, and wherein said gas separation system comprises a material or composition that adsorbs or absorbs gaseous substances from said mixture.

23. A method for sampling a solid object, the method comprising:

treating the solid object mechanically in sub-atmospheric pressure to remove a mixture of pulverized material and gaseous substances from the solid object;

aspirating the removed mixture through a solids separation system, thereby separating one or more solid fractions from said removed mixture; and after said solids separation, aspirating the rest of the mixture through a gas separation system, thereby separating one or more gaseous fractions from the mixture, wherein the solids separation system comprises a separation device that applies vortex separation to separate solid material from a solid/gas mixture.

* * * * *